(12) United States Patent
Murgai

(10) Patent No.: US 7,921,877 B2
(45) Date of Patent: Apr. 12, 2011

(54) SPOOL VALVE AND METHOD

(75) Inventor: Anil Murgai, Lisle, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 848 days.

(21) Appl. No.: 11/753,201

(22) Filed: May 24, 2007

(65) Prior Publication Data

US 2008/0289707 A1 Nov. 27, 2008

(51) Int. Cl.
F16K 11/07 (2006.01)
(52) U.S. Cl. ............... 137/625.38; 251/282
(58) Field of Classification Search .............. 137/625.3, 137/625.37, 625.38, 625.48, 625.5; 251/282
See application file for complete search history.

(56) References Cited

U.S. PATENT DOCUMENTS

| | | | | |
|---|---|---|---|---|
| 1,208,590 A * | 12/1916 | Lilly | | 251/325 |
| 2,141,614 A * | 12/1938 | Mott | | 236/99 R |
| 2,355,458 A * | 8/1944 | Mastenbrook | | 122/479.1 |
| 3,709,245 A * | 1/1973 | O'Connor, Jr. | | 251/127 |
| 3,794,063 A * | 2/1974 | Carroll et al. | | 137/505.26 |
| 4,022,423 A * | 5/1977 | O'Connor et al. | | 251/127 |
| 4,054,155 A * | 10/1977 | Hill | | 137/625.48 |
| 4,681,143 A * | 7/1987 | Sato et al. | | 137/625.37 |
| 4,825,906 A * | 5/1989 | Hartman | | 137/625.3 |
| 5,964,248 A * | 10/1999 | Enarson et al. | | 137/625.39 |
| 6,131,612 A * | 10/2000 | Beurskens | | 137/625.39 |
| 6,223,774 B1 * | 5/2001 | Fournier et al. | | 137/637.2 |

* cited by examiner

*Primary Examiner* — John Fox

(74) *Attorney, Agent, or Firm* — Jack D. Nimz; Jeffrey P. Calfa

(57) ABSTRACT

A valve (200) for routing a fluid includes a housing (220) having an inlet (222) and at least one outlet port (224). A valve member (218) is located in the housing (220). The valve (218) member has a wall (232) enclosing a cavity (230). A plurality of inlet openings (234) is formed in the wall (232). At least one of the plurality of inlet openings (234) fluidly connects the inlet (222) of the housing (220) with the cavity (230), and the at least one outlet port (224) may be selectively fluidly connected to the cavity (230).

5 Claims, 3 Drawing Sheets

SPOOL VALVE AND METHOD

FIELD OF THE INVENTION

This invention relates to spool valves, including but not limited to spool valves used to route fluids from an inlet to one or more outlets.

BACKGROUND OF THE INVENTION

Spool valves are known for disrupting fluid flows within passages, including routing a flow of fluid from an inlet passage to one or more outlet passages. Specifically in internal combustion engines, spool valves are often used to route a fluid, such as engine coolant, from an inlet to one or more outlets.

Typical spool valves are prone to hysterisis and may require relatively large actuator forces to move a spool member within a housing. These negative attributes are often attributed to pressure imbalances that may be present within a valve during operation. Often, a net pressure difference between an open and a closed passage may impart a net force onto surfaces of the spool, necessitating an actuator to overcome this net force in moving the spool from one position to another.

SUMMARY OF THE INVENTION

A valve for routing a fluid includes a housing having an inlet and at least one outlet port thereon. A valve member is located in the housing. The valve member has a wall enclosing a cavity. A plurality of inlet openings is disposed in the wall. At least one of the plurality of inlet openings fluidly connects the inlet of the housing with the cavity, and the at least one outlet port may be selectively fluidly connected to the cavity.

DESCRIPTION OF A PREFERRED EMBODIMENT

The following describes an apparatus for and method of balancing a pressure on or around a spool of a valve used to control a flow of fluid. A resultant balance of pressures, and therefore forces, on the spool enables motion of the spool from one location to another with less force, and advantageously lends to a more stable control of the position of the spool by an actuator.

Figure 1:
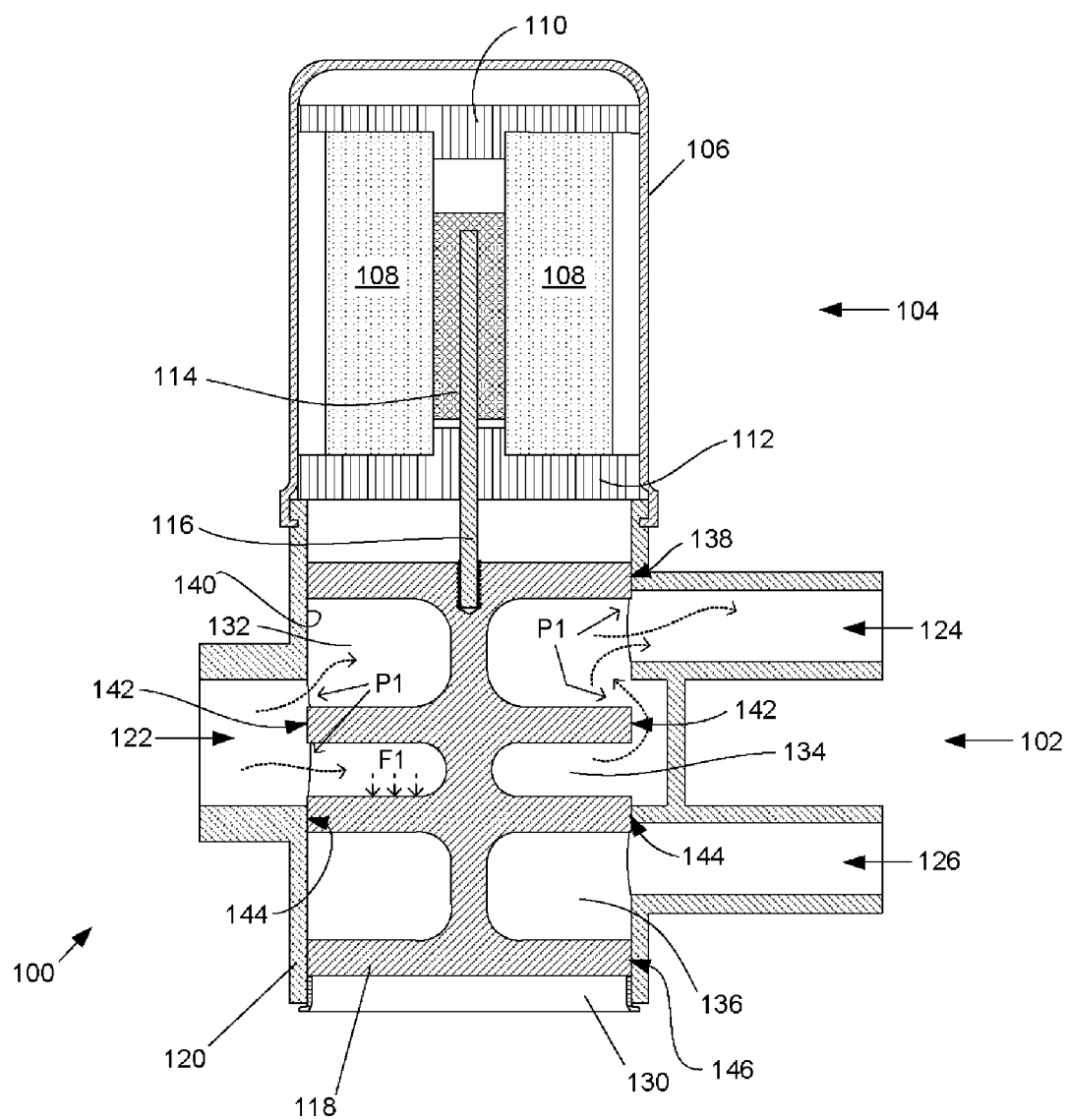
FIG. 1 is a cross section view of a known spool valve configuration that is prone to imbalances.

A known spool valve 100 is shown in FIG. 1. The spool valve 100 has a valve portion 102 and an actuator portion 104. The actuator portion 104 includes a canister 106 that houses a solenoid 108. The solenoid or spool 108 may be attached between a first header 110 and a second header 112. A core element 114 may be slideably located in the spool 108 and arranged to move axially along the spool 108 under a magnetic force that is created when electrical current passes through the spool 108 as is known. A shaft 116 may be engaged with the core 114 and arranged for motion therewith. The shaft 116 may be connected to a valve member 118 enclosed in a valve housing 120 of the valve portion 102 of the valve 100.

The housing 120 may have a first fluid opening 122, a second fluid opening 124, and a third fluid opening 126. In the configuration shown, the first opening 122 may be an inlet, and the second and third openings 124 and 126 may be outlets. The valve 100 may be arranged to route an incoming flow to the inlet 122 selectively to each of the outlets 124 and 126 depending on a position of the valve member 118 in the housing 120. In the position shown, the valve 118 is disposed low in the housing 120 to fluidly connect the inlet 122 with the first outlet 124. A plug 128 may be press-fit or otherwise connected to the housing 120, and may serve as a stop for the valve member 118.

The valve member 118 may have a first annular passage or channel 132, a second annular passage or channel 134, and a third annular passage 136 or channel 136 therein. Each of the channels 132, 134, and 136 may serve to direct a fluid flow from the inlet 122 to one or both of the outlets 124 and 126 during operation of the valve 100. A first sealing interface 138 on an outer diameter of the valve member 118 may be arranged to sealably and slideably engage an inner diameter of a bore 140 of the housing 120. A second sealing interface 142 may separate the first and second channels 132 and 134, a third sealing interface 144 may separate the second and third channels 134 and 136, and finally a fourth sealing interface 146 may sealably isolate the third channel 136 from the plug 130. Each of the sealing interfaces 142, 144, and 146 may also slideably and sealably engage the bore 140 of the housing 120.

During operation of the valve 100 a flow of fluid, denoted by the dashed line arrows, may enter the inlet 122 and, in the position of the valve member 118 within the housing 120, pass through the first channel 132 and the second channel 134, and enter the first outlet 124. A position of the valve member 118 in the bore 140 of the housing 120 may determine whether a portion of the flow entering the inlet 122 may be routed to the first outlet 124 and/or the second outlet 126. One disadvantage with the configuration of the valve 100 is a pressure imbalance that is created within the housing 120 that may impart a net force that impedes a motion of the valve member 188. For example, in the position shown in FIG. 1, a dynamic pressure, P1, due to flow forces may be present in passages connected to the inlet 122 and the first outlet 124. The flow pressure P1 may impart a total force, F1, in the direction shown by the dashed arrows on the valve member 118 in a direction opposing a motion of the valve member 118 toward the actuator portion 104. The force F1 may be a result of the flow pressure P1 acting the valve member 118 close to the interfaces 138 and 142 during operation, especially under conditions of high fluid flows. This and other disadvantages may be avoided with an improved spool design as described below.

Figure 2:
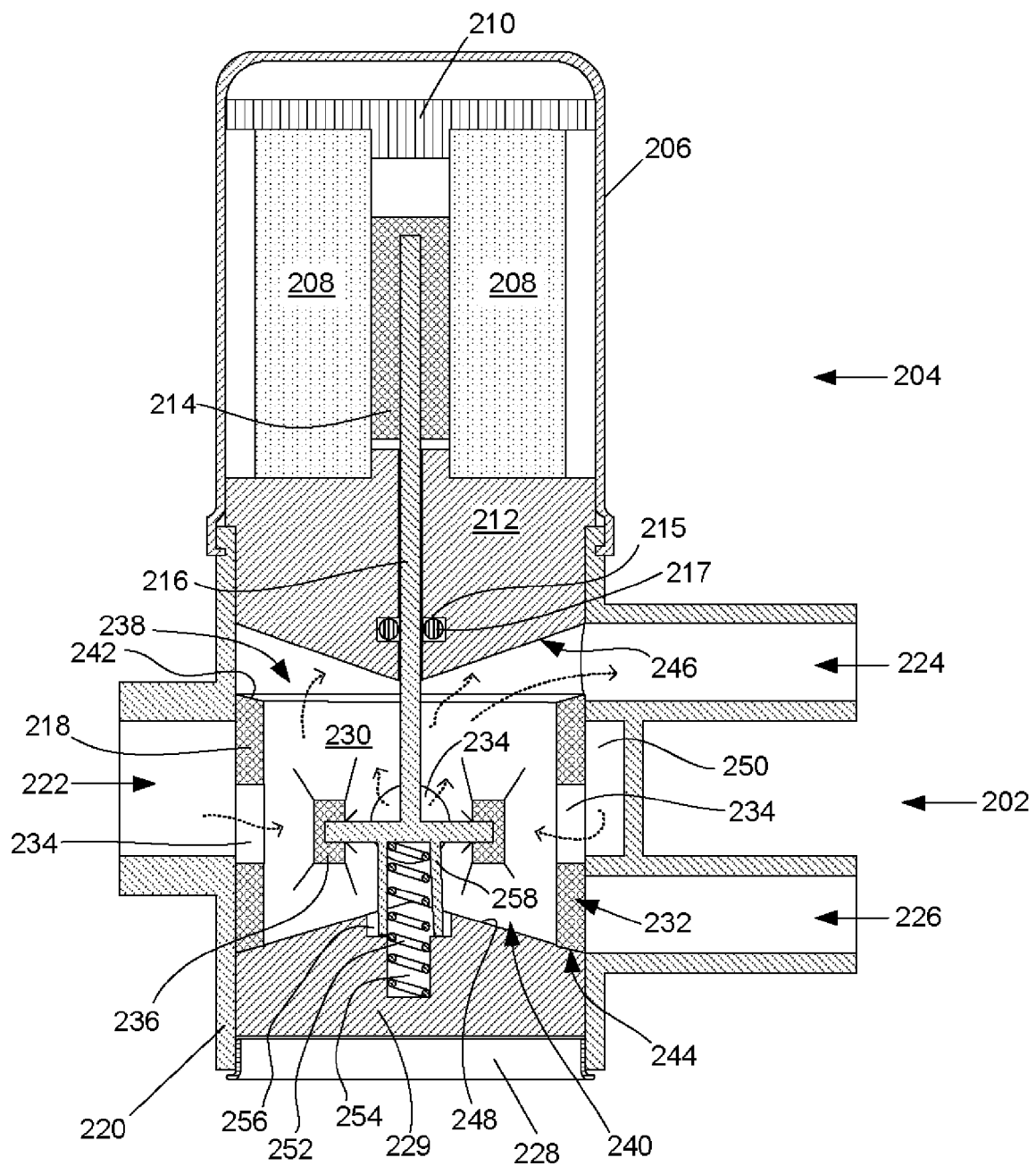
FIG. 2 is a cross section view of a spool valve in accordance with the invention.

An improved valve assembly 200 is shown in cross section in FIG. 2. The valve 200 has a valve portion 202 and an actuator portion 204. The actuator portion 204 includes a canister 206 that houses a solenoid or 208. The solenoid 208 may be attached between a first header 210 and a second header 212. A core element 214 may be slideably located in the solenoid 208 and arranged to move axially along the solenoid 208 under a magnetic force that is created when electrical current passes through the solenoid 208. A channel 215 may be disposed in the second header 212. A shaft 216 may be engaged with the core 214 and arranged for motion therewith, and a seal 217 may be disposed in the channel 215 and arranged to provide a sliding seal function around the shaft 216. The shaft 216 may be connected to a valve member 218 enclosed in a valve housing 220 of the valve portion 202 of the valve 200.

The housing 220 may have a first fluid opening 222, a second fluid opening 224, and a third fluid opening 226. In the configuration shown, the first opening 222 may be an inlet, and the second and third openings 224 and 226 may be outlets. The valve 200 may be arranged to route an incoming flow at the inlet 222 selectively to each of the outlets 224 and/or 226 depending on a position of the valve member 218 in the housing 220. In the position shown, the valve 218 is disposed "low" or away from the actuator portion 204 in the housing 220, and fluidly connects the inlet 222 with the first outlet 224. A plug 228 may be press-fit or otherwise connected to the housing 220, and may serve as a stop for the valve member 218. A valve seat 229 may be located in the housing 220 adjacent or, alternatively, integrated with the plug 228, and serve as a seat for the valve member 218.

The valve member 218 may advantageously have a substantially cylindrical shape and is open at each of the bases and creates an inner cavity 230 that is surrounded by a cylindrical wall portion 232. A plurality of openings 234 may be fashioned in the wall 232 around a periphery thereof, that are advantageously arranged in a symmetrical pattern, for instance, four (4) openings 234 may be arranged at about 90 degrees apart from each other along a diameter of the wall 232. A shaft support feature 236 may be fashioned within the cavity 230 to provide support for and a connection point to the shaft 216.

The wall 232 may create a first opening 238 on one distal axial end, and a second opening 240 on another axial distal end, or, along each of the bases of the cylindrical shape of the valve member 218. Each of the first opening 238 and the second opening 240 may be surrounded by a first tapered surface 242 and a second tapered surface 244 respectively. The tapered surfaces 242 and 244 may create an interface between the openings 238 and 240 with the wall 232. The second header may have a conical or tapered interface surface 246 thereon in a direction toward the valve element 218. The tapered surface 242 may advantageously be arranged to mate with a taper of the interface surface 246. Similarly, the valve seat member 229 may have a tapered surface 248 thereon that is arranged to mate with the tapered surface 244 on the valve element. The tapered surfaces 246 and 248 may advantageously be arranged and constructed to be sealed interfaces when one of the tapered surfaces 242 and 244 of the valve 218 are in contact therewith.

The valve housing 220 may advantageously have an annular passage 250 in a section surrounding the valve member 218 adjacent to the openings 234 to facilitate a symmetrical of flow of fluid entering the inlet 222 to pass through the openings 234 into the cavity 230 and, in the position shown in FIG. 1 for example, exit through the opening 238 and enter the outlet 224.

Additional components may improve a capability of the valve 200 to modulate one or more streams of flow between the inlet 222 and one or more of the outlets 224 and 226. A spring 252, for example, may rest between the shaft 216 and the valve seat member 229. The spring 252 may be positioned in a bore 254 of the member 229. Additionally, an optional alignment bore 256 may also be fashioned in the member 229 that is arranged to align a protrusion 258 in or around the shaft 216.

During operation of the valve 200 a flow of fluid, denoted by the dashed line arrows, may enter the inlet 222 and, in the position of the valve member 218 within the housing 220, pass through the openings 234 and enter the cavity 230. From the cavity 230, the flow of fluid may exit through the opening 238 and be accumulated through the outlet 224. A symmetry in the positions of the openings 234 in the wall 232 advantageously reduces or cancels any orientation-specific flow forces that may be imparted onto the valve member 218 during operation. Moreover, the tapered surface 242 around the opening 238, and/or the tapered surface 246 on the second header 212 may advantageously provide a smooth transition for fluid exiting the cavity 230 through the opening 238 during operation, thus further reducing or canceling any flow forces on the valve member 218.

The valve 200 is more effective in directing a flow of fluid than a valve having a design similar to the valve 100 described above. The valve 200 having a hollow valve member 218 that allows fluid to pass therethrough and exit an opening 238 is capable of reducing or, in part because of the overall symmetry of the design, eliminating the effect of any asymmetrical flow forces acting on and impeding the motion of the valve member 218 within the housing 220.

Figure 3:
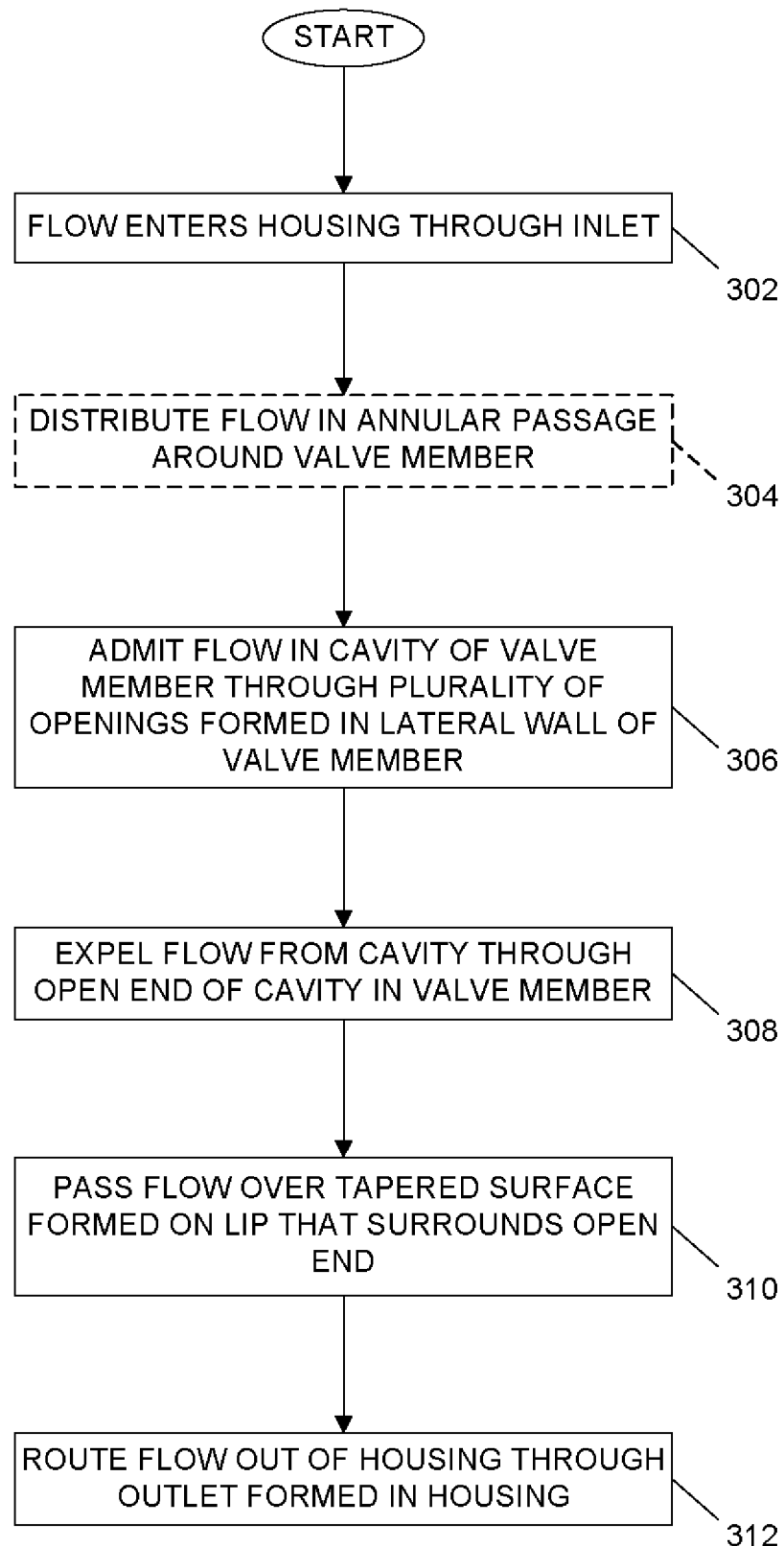
FIG. 3 is a flowchart for a method in accordance with the invention.

A flowchart for a method of directing a flow of fluid from an inlet to one or more outlets of a housing is shown in FIG. 3. Flow enters a housing through an inlet at step 302. The flow entering the inlet may be optionally distributed in an annular passage around a valve member at optional step 304 before entering a cavity of a hollow valve member at step 306 through a plurality of openings in a lateral wall of the valve member. The openings and the valve member may advantageously be configured symmetrically to reduce any flow effects that may impede the motion of the valve member within the housing. The flow of fluid from within the cavity of the valve member may exit the valve member through an open end thereof at step 308, pass over a tapered surface of a lip the surrounds the open end at step 310, and exit the housing through an outlet at step 312. The valve member may advantageously have a hollow cylindrical shape, with the openings for inlet of fluid therein disposed along a diameter of the valve member that is advantageously arranged to be adjacent to the annular passage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A valve for routing a fluid, comprising:
   a housing having an inlet and at least one outlet port;
   a valve member disposed in the housing, the valve member having:
      a wall enclosing a cavity;
         a plurality of inlet openings disposed in the wall, wherein at least one of the plurality of inlet openings fluidly connects the inlet of the housing with the cavity; and
         wherein at least one outlet port is selectively fluidly connected to the cavity;
      an outlet opening disposed at a distal end of the valve member;
   a first header and a second header disposed around the valve element;
      wherein each of the first header and second header has a tapered surface fashioned thereon and the tapered surface on each of the first header and the second header is arranged to mate with a corresponding tapered surface disposed around the outlet opening of the valve member.

2. The valve of claim 1; wherein the outlet opening selectively connects the cavity with at least one outlet port.

3. The valve of claim 1, further comprising a shaft connected to the valve member.

4. The valve of claim 1, further comprising an annular passage in the housing, wherein the annular passage is operatively associated with the plurality of inlet openings of the valve member.

5. A valve for routing a fluid, comprising:
   a housing having an inlet and at least one outlet port;
   a valve member disposed in the housing, the valve member having:
   a wall enclosing a cavity;
      wherein the wall has a lip section with a tapered surface around an opening at a distal end of the valve member; and
      wherein the tapered surface is arranged to sealably contact a corresponding tapered surface on a header piece, the header piece disposed adjacent to and in selectable contact with the valve member
   a plurality of inlet openings disposed in the wall, wherein at least one of the plurality of inlet openings fluidly connects the inlet of the housing with the cavity; and
   wherein the at least one outlet port is selectively fluidly connected to the cavity.

* * * * *